United States Patent
Beresford et al.

(10) Patent No.: US 7,009,707 B2
(45) Date of Patent: Mar. 7, 2006

(54) APPARATUS AND METHOD OF SENSING FLUID FLOW USING SENSING MEANS COUPLED TO AN AXIAL COIL SPRING

(75) Inventors: John Michael Beresford, Dorset (GB); Christopher John Collister, Dorset (GB)

(73) Assignee: THALES Underwater Systems UK Limited, Somerset (GB)

( * ) Notice: Subject to any disclaimer, the term of this patent is extended or adjusted under 35 U.S.C. 154(b) by 445 days.

(21) Appl. No.: 10/114,992

(22) Filed: Apr. 4, 2002

(65) Prior Publication Data

US 2002/0174728 A1 Nov. 28, 2002

(30) Foreign Application Priority Data

| Apr. 6, 2001 | (EP) | ............................................. 01303278 |
| Apr. 6, 2001 | (GB) | ............................................. 0108739 |
| Jan. 4, 2002 | (GB) | ............................................. 0200139 |

(51) Int. Cl.
*G01B 9/02* (2006.01)

(52) U.S. Cl. ....................................................... 356/478
(58) Field of Classification Search ................. 356/477, 356/478; 250/227.19, 227.27; 385/12
See application file for complete search history.

(56) References Cited

U.S. PATENT DOCUMENTS

| 5,155,548 A | 10/1992 | Danver et al. |
| 5,661,248 A | 8/1997 | Bernicot et al. |
| 6,072,567 A | 6/2000 | Sapack |

FOREIGN PATENT DOCUMENTS

| EP | 0 109 345 | 5/1984 |
| EP | 0 519 754 A2 | 12/1992 |
| EP | 1 085 301 A2 | 3/2001 |
| GB | 2 132 761 A | 7/1984 |
| GB | 2 135 446 A | 8/1984 |
| GB | 2 238 380 A | 5/1991 |
| GB | 2 254 148 A | 9/1992 |
| JP | 7-62719 | 3/1995 |
| WO | WO 00/00793 | 1/2000 |

*Primary Examiner*—Samuel A. Turner
(74) *Attorney, Agent, or Firm*—Oblon, Spivak, McClelland, Maier & Neustadt, P.C.

(57) ABSTRACT

An apparatus and method of sensing fluid flow are provided to measure fluid flow rates in production tubing, pipelines, open wells and tunnels. The proposed invention takes advantage of a sensor with processing means to interpret the fluid flow rate, the sensor being responsive to the mechanical perturbations of the sensor itself arising from the impingement of turbulent fluid flow on the sensor. In operation, the sensor is mounted in the fluid flow such that the fluid flows through an aperture in the sensor and/or around the outside surface of the sensor. The sensor of the invention bears definite advantage over known sensors and it is particularly suited to downhole oil and gas applications. Preferably, the invention employs fiber optic sensing techniques which are amenable to multiplexing a plurality of the sensors with long down leads. Such an arrangement is robust to withstand the high temperature and pressure environment. Advantageously, the invention allows non-intrusive measurement of fluid flow in production pipes and measurement of differential fluid flows along perforated casing or open well sections in the pay zone.

43 Claims, 17 Drawing Sheets

APPARATUS AND METHOD OF SENSING FLUID FLOW USING SENSING MEANS COUPLED TO AN AXIAL COIL SPRING

FIELD OF THE INVENTION

The present invention relates to an apparatus and a method of sensing fluid flow. More particularly though not exclusively, the present invention relates to a fluid flow sensing system employing a sensor device together with remote processing means to provide the user with measurements of fluid flows in production tubing, pipelines, open wells, tunnels and the like.

BACKGROUND OF THE INVENTION

In the extraction of oil from wells it is becoming increasingly beneficial to mount pressure and temperature gauges in the completion tubing so that on-line measurements may be made. These are useful for purposes of controlling the flow of oil and water and gas being produced, and planning remedial actions when the well has undesirable attributes. There is also merit in directly measuring the flow of these fluids by some form of flow sensor—but the current art in oil producing practice requires the intervention of the production tubing by insertion of spinner devices fixed to a logging tool. There is also a particular need to measure flow directly at the perforated sections of the production tubing, or even in the open well where stinger mounted sensors may be positioned. Currently there are no operational systems that achieve these direct measurements of flow at the perforations. With the coming of the so-called intelligent or smart completions, downhole control valves are now being used operationally to control the flow of fluids into and out of laterals for water injection and production wells respectively and it is now a more urgent requirement to measure where the water is going and which laterals are contributing to the fluid flow in order to make effective use of these control valves. The traditional methods of using electronic sensors for pressure and temperature have gained a poor reputation due to the unreliability of electronics at the elevated temperatures (up to 190° C.) to be found in the downhole hostile environment. Pressure and temperature gauges for permanent monitoring downhole oil and gas wells are now benefiting from their implementation using passive fibre optic sensor technology which is better able to withstand the harsh temperature environments than electronics systems. Thus the need for on-line downhole fluid flow meters in the high temperature well environment is best suited by the implementation of the flow sensor in fibre optic technology. Although previous attempts at deploying fibre optic techniques are becoming known the subject of the current invention is concerned with the production of the fluid flow into a measurable mechanical quantity that can be instrumented with a plurality of sensor technologies but in particular amenable to fibre optic sensing with the aforesaid benefits. Thus a reliable fibre optic flow sensor is desired for measurement of the (1) low flow rates which may be experienced at the Total Depth (TD) of well, and (2) high rates which may be experienced at the production tubing carrying the fluid to the surface.

OBJECTS AND SUMMARY OF THE INVENTION

The principal object of the present invention is to overcome or at least substantially reduce some at least of the above mentioned drawbacks associated with known fluid flow sensing systems.

It is an object of the present invention also to provide a single-phase flow meter which is capable of (1) providing sensitivity over the range 200 to 20,000 barrels/day and (2) operating up to temperatures of 190° C. in the harsh downhole environment.

It is another object of the present invention also to provide an improved fluid flow sensor which can measure fluid flow in water injection wells and oil and gas production wells by the ability to place non-invasive sensors in either the production tubing above or below packers or in between the perforations in a cased well or indeed in the open well.

Further, it is another object of the present invention also to provide a novel low cost flow sensor which can be installed in wells during completion operations so that water, and oil and gas recovery may be monitored on-line so that control of the wells and planning of new wells may be exercised to maximise oil or gas production.

In broad terms, the present invention resides in the concept of taking advantage of a fluid flow sensor with an enhanced detection capability which can respond to the mechanical perturbations of the sensor itself arising from the impingement of turbulent fluid flow on the sensor.

Therefore, according to one aspect of the present invention there is provided a fluid flow sensing apparatus for measuring a fluid flow rate, the apparatus comprising: fluid flow sensing means for sensing perturbations associated with the apparatus, the perturbations being produced by the broadband energy in the turbulent fluid flow impinging on said apparatus, means for deriving a signal response representative of the sensed perturbations and processing means for processing the derived signal response to provide measurement of the fluid flow rate at a predetermined location.

The fluid flow sensing means advantageously comprises a sensor device having a body member (a cylindrical member for example) with an aperture, the sensor device being so formed to permit the passage of the fluid flow through the aperture and/or around the outside surface of the body member.

The sensor of the invention can be conveniently mounted either directly into a production pipe sub, or attached to a extension thereof/the so called stinger projecting down beyond the packers into the production zone. Further, the sensor can be installed after the casing is completed and together with the production tubing installations. The sensor can be also installed between packers or control valves in sectioned intervals of the production zone.

Conveniently, the sensor of the invention can be preinstalled in production tubing to determine fluid flow rates for the lifetime of the production tubing, thereby dispensing with the need for expensive logging intervention associated with spinner-type flow meters.

Further, the sensor of the invention finds utility for many applications such as in pipelines and tunnels.

In accordance with an exemplary embodiment of the invention which will be described hereafter in detail, there is provided a fibre optic sensing system incorporating a fluid flow sensing apparatus of the kind as described hereinabove. In this embodiment, while the system is more rugged than electronic systems, the method of deployment conveniently uses optical cables or standard control tube techniques which are familiar to oil companies for the deployment of fibre optic temperature and pressure gauges, and furthermore, the optical architecture is such that the sensors may be sited at different levels within the production well.

In the above mentioned embodiment the fibre optic sensor conveniently comprises a fibre optic sensing coil embedded into a material of relatively low bulk modulus which in turn is encased in a corrosion resistant pressure housing such as stainless steel or titanium. In this embodiment, time multiplex means and/or optical frequency multiplex means can be advantageously provided to multiplex a number of fibre optic sensors onto one optical fibre, enabling fluid flow gradients to be measured along an array of such sensors over spatial distances up to and typically in excess of 10 Km.

The fibre optic sensor is conveniently connected to a fibre cable which is used to carry laser power to the sensor. The resulting reflected phase modulated light signals from the sensor are in turn carried to an opto-electronic processor sited in a habitable workspace, using an architecture and sensing technique similar to that disclosed in GB2126820 and U.S. Pat. No. 4,653,916 for example, and well-removed from the borehole environment or other harsh environment.

In accordance with another embodiment of the invention which will be described hereafter in detail, there is provided an improved fluid flow sensing system incorporating a novel mechanical filter in the design of the sensing means such that the interference effects attributed to the broadband excitation of the entire support structure are removed directly. In the absence of this mechanical filter, the sensing means could be otherwise perturbed by the supporting structure and provide erroneous measurements of fluid flow.

According to another aspect of the present invention there is provided a method of measuring a fluid flow rate, the method comprising sensing perturbations associated with a fluid flow sensing apparatus or system of the kind as described hereinabove, said perturbations being produced by the broadband energy in the turbulent fluid flow impinging on said apparatus or system;

deriving a signal response representative of the sensed perturbations; and processing the derived signal response to provide measurement of the fluid flow rate at a predetermined location.

Advantageously, the sensing step of the method can be carried out optically using a fibre optic sensing coil.

Having regard to the foregoing, it is to be appreciated that the generic method of optical sensing using time domain reflectometric interferometer techniques is well known to the skilled man in the art (see GB2126820 and U.S. Pat. No. 4,653,916 for example). In contrast, the heart of the present invention is directed to an apparatus and method for extracting turbulent flow energy from fluid and thereby sensing the mechanical perturbations of the sensor itself. It is, therefore, important in this invention to recognise that the actual sensor technology could be various and inclusive of electronic technology where high temperature/harsh environments are not such an issue, for example where there is a measurement of fluid flow in surface or buried pipes or tunnels.

The above and further features of the invention are set forth with particularity in the appended claims and will be described hereinafter with reference to the accompanying drawings.

DETAILED DESCRIPTION OF THE PREFERRED EMBODIMENT

Figure 1:
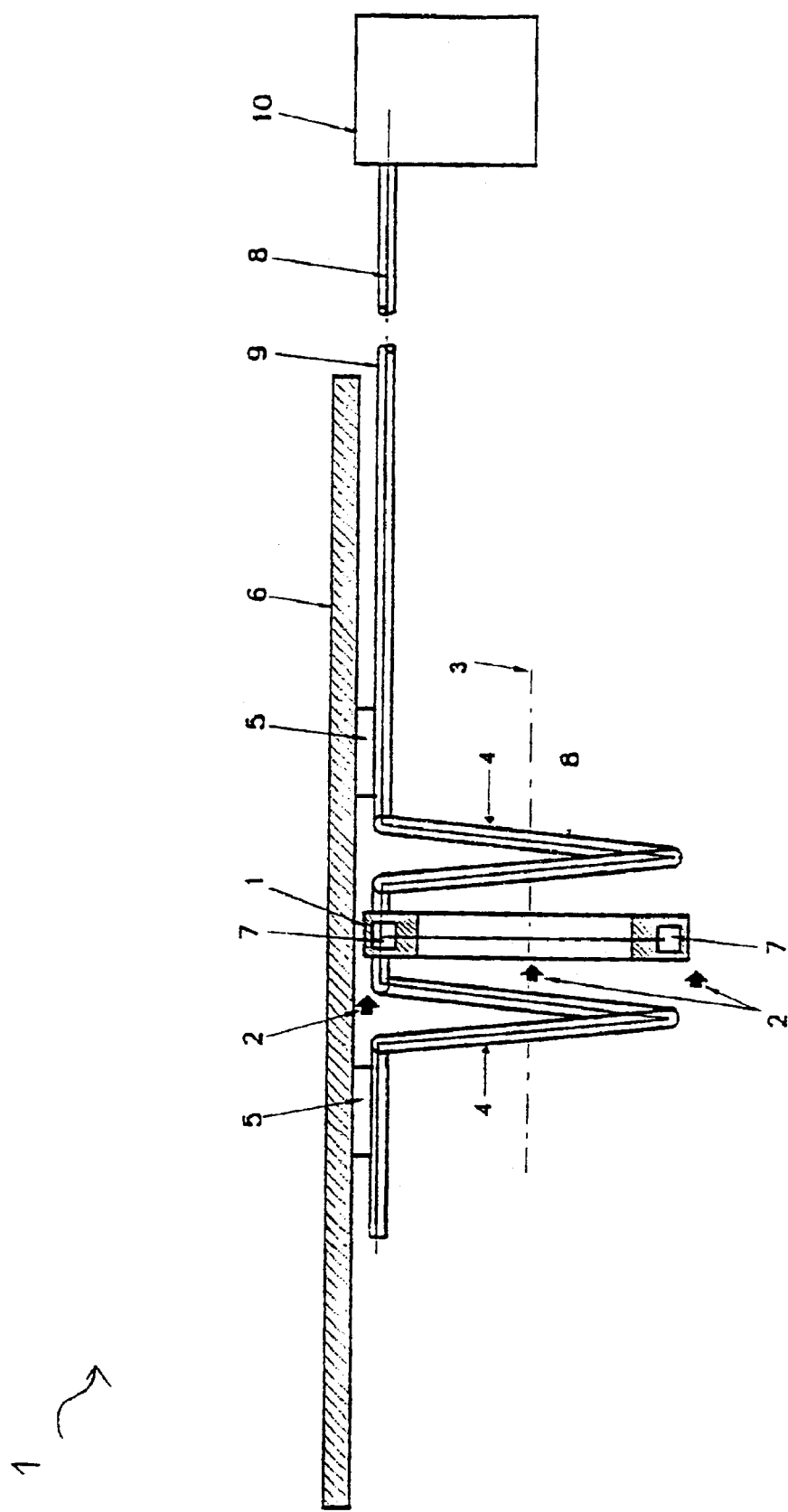
FIG. 1 is a block diagram of a fluid flow sensing apparatus embodying the present invention.

Referring first to FIG. 1, there is shown a fluid flow sensing apparatus 1' embodying the present invention. The fluid flow sensing apparatus 1', generally referred to hereinafter as the sensor device, comprises a cylindrical body member 1 with an aperture immersed in flow of fluid 2 such that the fluid flow passes through the aperture and/or around the outside surface of the body member 1 along a predetermined axis shown as 3. The sensor device 1' is attached to springs 4 which allow the device 1' to be perturbed in a direction of this axis 3 by the energy contained in the broadband turbulent flow impinging on the device 1'. The springs 4 are conveniently axial coil springs which, in combination with the mass of the device 1', enable the device 1' to vibrate at resonant frequency in the direction of the axis 3 caused by the broadband energy in the frequency spectrum of the forces in the turbulent fluid flow impinging on the device 1'. In operation of the device 1', it is noted that the device 1' senses the resulting mechanical perturbations at the resonant frequency or off the resonant frequency such that a measurement of fluid flow rate is made at a particular location.

The springs 4 are anchored by mounts 5 to a stationary part such as pipework or concrete anchorage point 6. The device is thus free to resonate due to the broadband excitation of the resonant structure as hereinafter described. A distributed sensor 7 mounted within the body of the device responds to the perturbations or trembling of the device due to the turbulent flow of the fluid and a cable 8 carrying signals from the sensor passes through the hollow springs 4 to the surface via high pressure control tube 9, to the equipment 10 at the surface. The hollow springs 4 therefore provide a dual function insofar as (1) they are used to accommodate the signal carrying means (cable 8) to permit transmission of the signal response from the device 1' to the processor 10, and (2) they are used to provide a resonance condition of the device 1' in use. It would also be apparent to anyone skilled in the art that the device 1' may be attached to a pipework or concrete anchorage point 6 by means of more rigid methods than the spring 4 shown in FIG. 1 and this would modify and raise the resonant frequency condition of the device 1'. Also methods other than the use of control tube may be used to deploy the signal cables and will be familiar to those skilled in the art of connecting sensors downhole in harsh environments. The output of sensor 7 representing the perturbations of the device are detected by the equipment 10 and the frequency power spectral density is computed, from which flow rate may be interpreted from a priori calibrations. The detailed discussions in a following section describe the perturbation analysis and the empirical results achieved with a particular embodiment of the sensor and processor of the invention.

A summary of the physical realisation of the invention is now discussed. It is to be appreciated that the sensor technology may comprise piezo-electric, piezo-magnetic, piezo-resistive, electro-strictive, electromechanical, micro-machined and optical technology as described hereinafter by way of examples. A skilled man in the art of vibration analysis would further recognise that there may be other technologies suited to this particular sensing application but which would not depart from the spirit and scope of the present invention. Each may have its merits and be able to pass signals via a cable 8 through the springs 4 and control tube 9 or other suitable cabling to a surface unit away from the harsh environment. In this particular embodiment however fibre optic technology is preferably used which is highly sensitive and suited to applications in high temperature oil wells, and also in this embodiment a housing is preferably provided to house a coil shaped fibre optic sensor 7 within the hollow cylindrically shaped device which relieves the high hydrostatic pressure environment from the fibre. In a similar fashion, the control tube 9 relieves the high pressure on the cable 8 en route to the surface equipment 10 which comprises laser source and opto-electronic processing.

Figure 2:
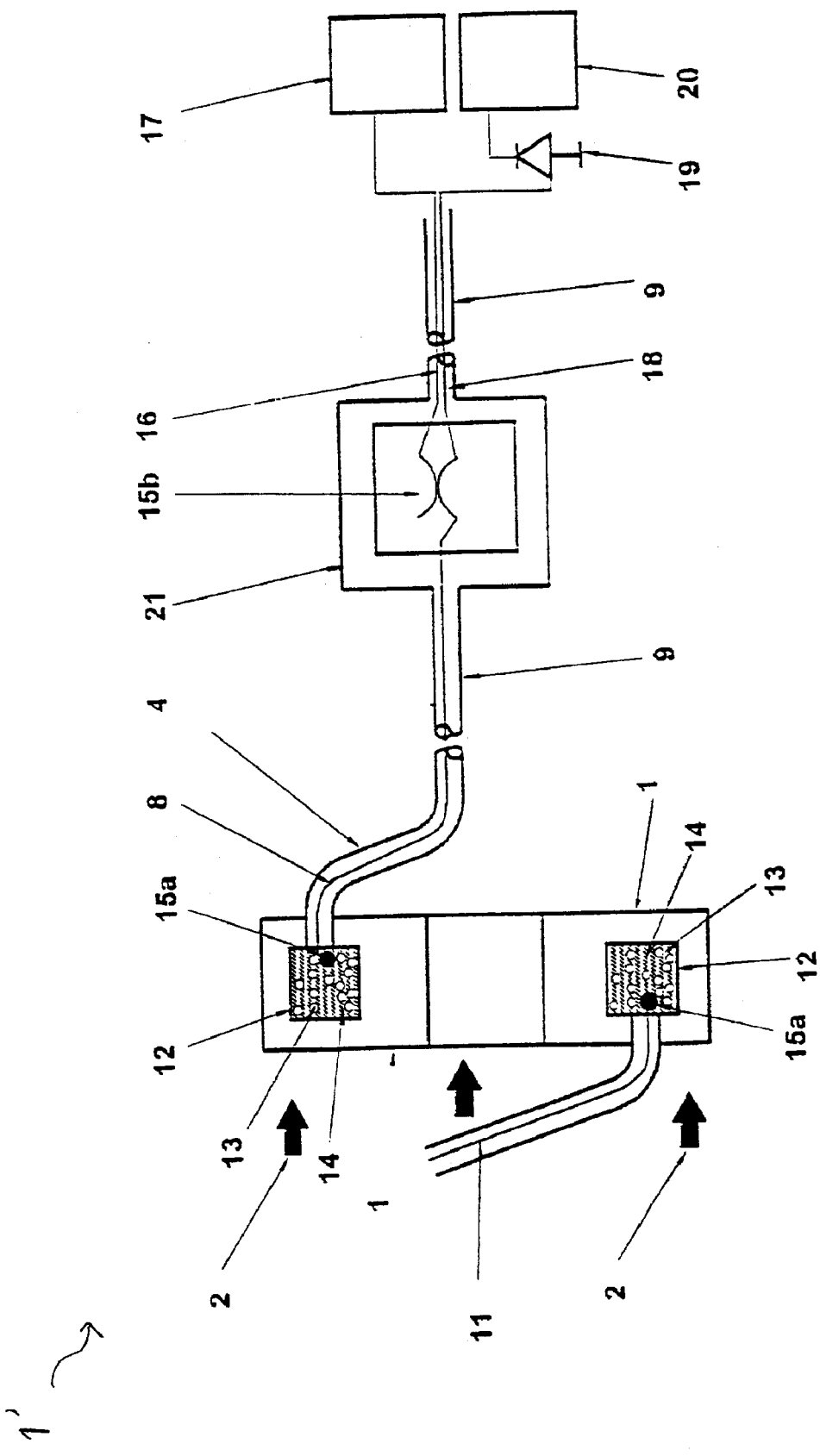
FIG. 2 is a block diagram of the apparatus of FIG. 1 showing how fibre optic sensing technology is implemented in the present invention.

Referring now to FIG. 2, a more detailed view of the sensor of FIG. 1 including the surface equipment is shown. The cylindrical device 1' made of hard material with high elastic modulus contains a cylindrical cavity 12 into which is wound a fibre optic sensing coil 13 embedded in an encapsulate 14 of relatively low elastic modulus. Time domain reflectometric interferometer techniques are advantageously employed, these being well known to those skilled in the art. The fibre optic sensing coil 13 forms one arm of the interferometric system and discontinuities 15a realise the partial reflectors within the fibre coil 13. A realisation of the discontinuity is the partial reflection obtained using optical 2×2 couplers 15b. The fibre cable 8, spliced to fibre coil 13, terminates at the 2×2 coupler 15b which in turn is used to split the downlead carrying coherent laser power via cable 16 (provided by solid state laser 17) from uplead cable 18 thereby supplying signals to photo diode receiver 19 for subsequent demultiplexing and demodulation processing by processor 20.

Having regard to application of the aforesaid sensor installed down wells for example, the fibre optic cables 8, 16 and 18 are deployed in control tubing 4,9 and the coupler 15b is also deployed in a pressure resistant housing 21. Clearly there are numerous other packaging techniques for protection of the fibre optic components 8, 15b, 16 and 18 from the harsh environments or indeed for any other of the described embodiments of the invention where a measurement of fluid flow is to be made.

The embodiment of FIG. 2 could be also modified to accommodate a plurality of flow sensors, the sensors being multiplexed onto the same optical cable 11 deploying a plurality of the fibre optic sensing coils 13 housed in a plurality of the devices 1', inter-connected with the fibre cable 11 using an optical architecture familiar to those skilled in the art of multiplexed optical fibre sensing using either time division or wave division multiplexing techniques or both. There now shall be described by way of example only, particular embodiments of the sensor of the invention for particular application in the downhole oil and gas environment.

Figure 3:
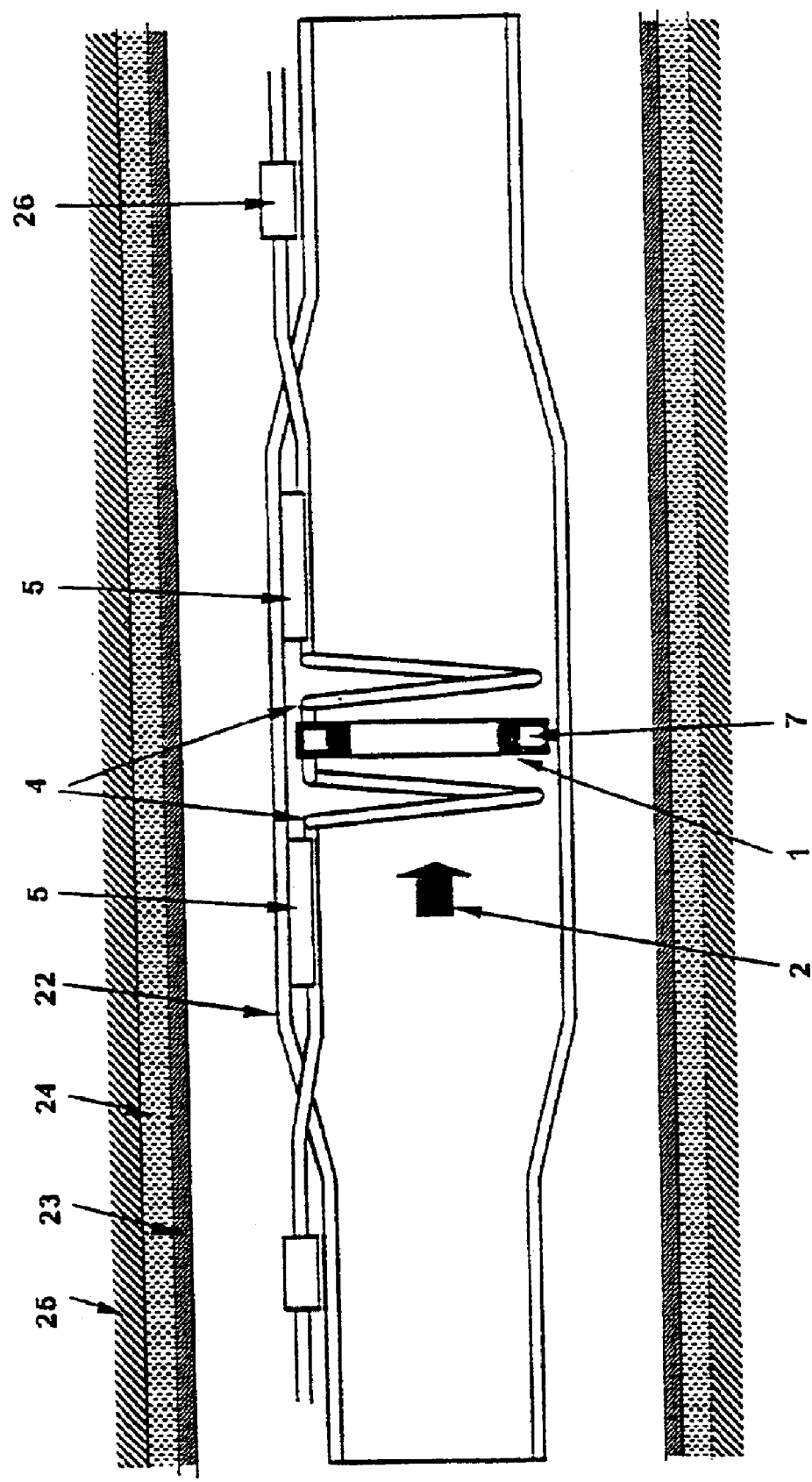
FIG. 3 shows an embodiment of the present invention for application in a production pipe.

FIG. 3 shows another embodiment of the present invention for particular application in a production pipe. More particularly, as shown in the Figure, the fluid flow 2 is measured in production tubing suitably bellowed 22 to accommodate the cylindrical device 1 and the springs 4. This bellowing feature facilitates the passage of drill pipe, coiled tubing or logging tools down through the flow sensor as is often the requirement but clearly the need to deploy a mechanical spinner type flow meter is obviated by the deployment of the sensor of the present invention. The design also allows multiplexing of fibre optic sensors onto a fibre optic cable (see FIG. 2) for purposes of making temperature and pressure measurements for example. Care in the sizing of the bellowed production tubing 22 is necessary to ensure that there is sufficient clearance in the completion casing 23 to allow bypass of the flow sensor with optical cable or control tube for purposes of deploying routinely installed distributed temperature sensing (DTS) which is envisaged to be used in conjunction with the sensor of the present invention. Similarly, sufficient annular space between tube 22 and casing 23 needs to be allowed to ensure that this annular space may be used to deploy the numerous fluids used in oil extraction. FIG. 3 uses the same reference numerals as were used to designate same/like parts in the description of FIGS. 1 and 2.

It would be apparent to anyone skilled in the art that instead of being installed on the inside of the production tubing as shown in FIG. 3, the sensor of the invention could also be configured in such a way as to be installed on the outside of the production tube. This would be of practical benefit in those situations where fluids flow on the outside of the production tube. It would also be apparent to anyone skilled in the art that the sensor of the invention could also be configured in such a way as to be installed on the inside of a section of borehole liner or casing. Such a configuration would be of practical benefit in those situations where no production tubing was present in a cased hole.

Figure 4:
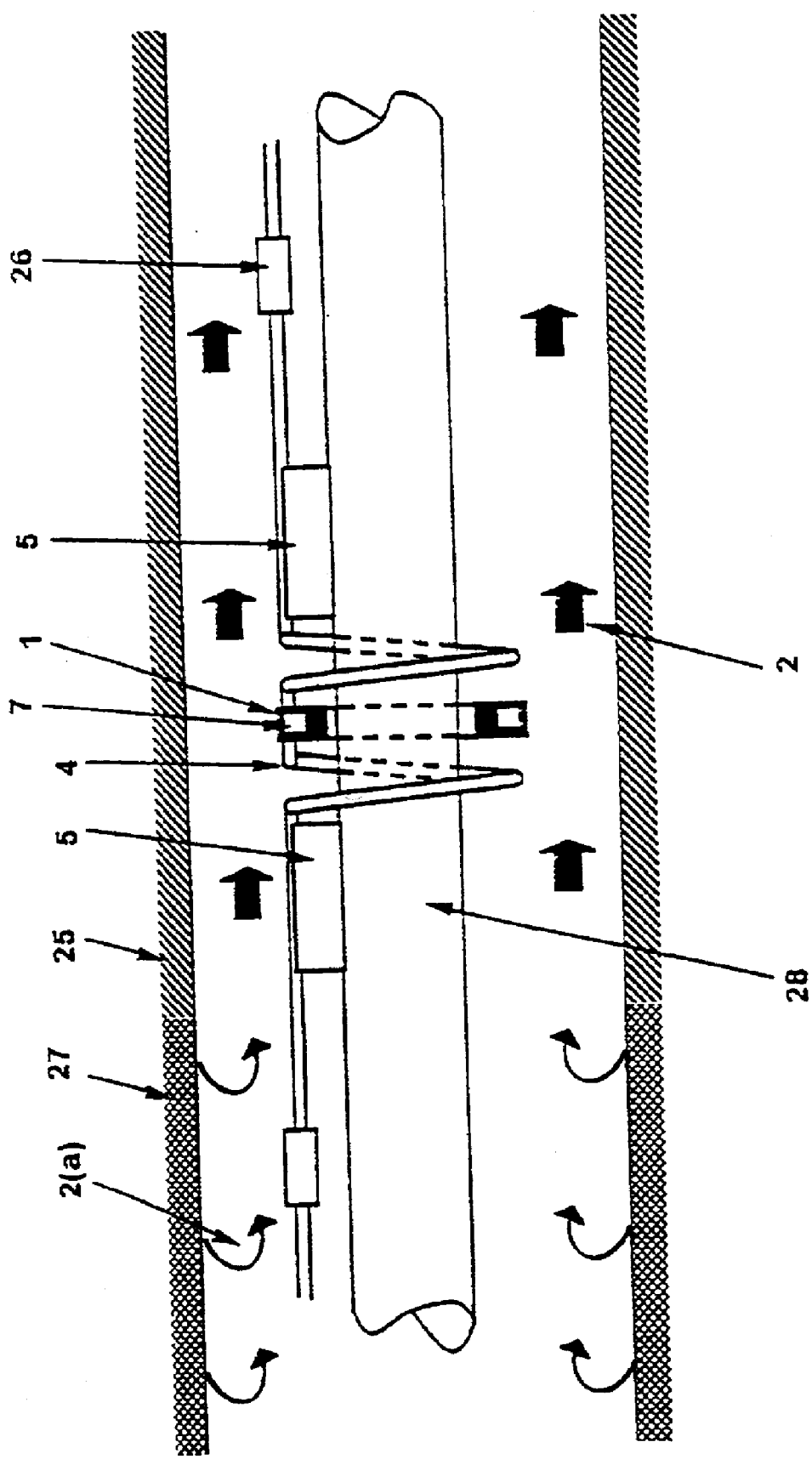
FIG. 4 shows another embodiment of the present invention for use on a stinger inserted into an open well at the production zone.

Turning now to FIG. 4 there is shown another embodiment of the invention where the fluid flow is measured in an open well 25 at the producing zone. The device 1 and springs 4 are mounted 5 onto an extension of the production tube onto the so called Stinger 28, a steel member which is routinely pushed into open wells for the purposes of instrumentation and fluid injection.

The flow of fluid 2(a) from the permeable zone of the well 27 passes around the device 1 in a zone of the well 25 where the rock is impermeable whereby the measurement of fluid flow 2 at the sensor is the accumulation of all flow 2(a) up stream of the sensor. The stinger may continue to serve to carry out deployment of other sensor gauges, distributed temperature systems or fluid injection operations by suitable detailed design by those skilled in the art. FIG. 4 uses the same reference numerals as were used to designate same/like parts in the description of FIGS. 1 to 3.

Figure 5:
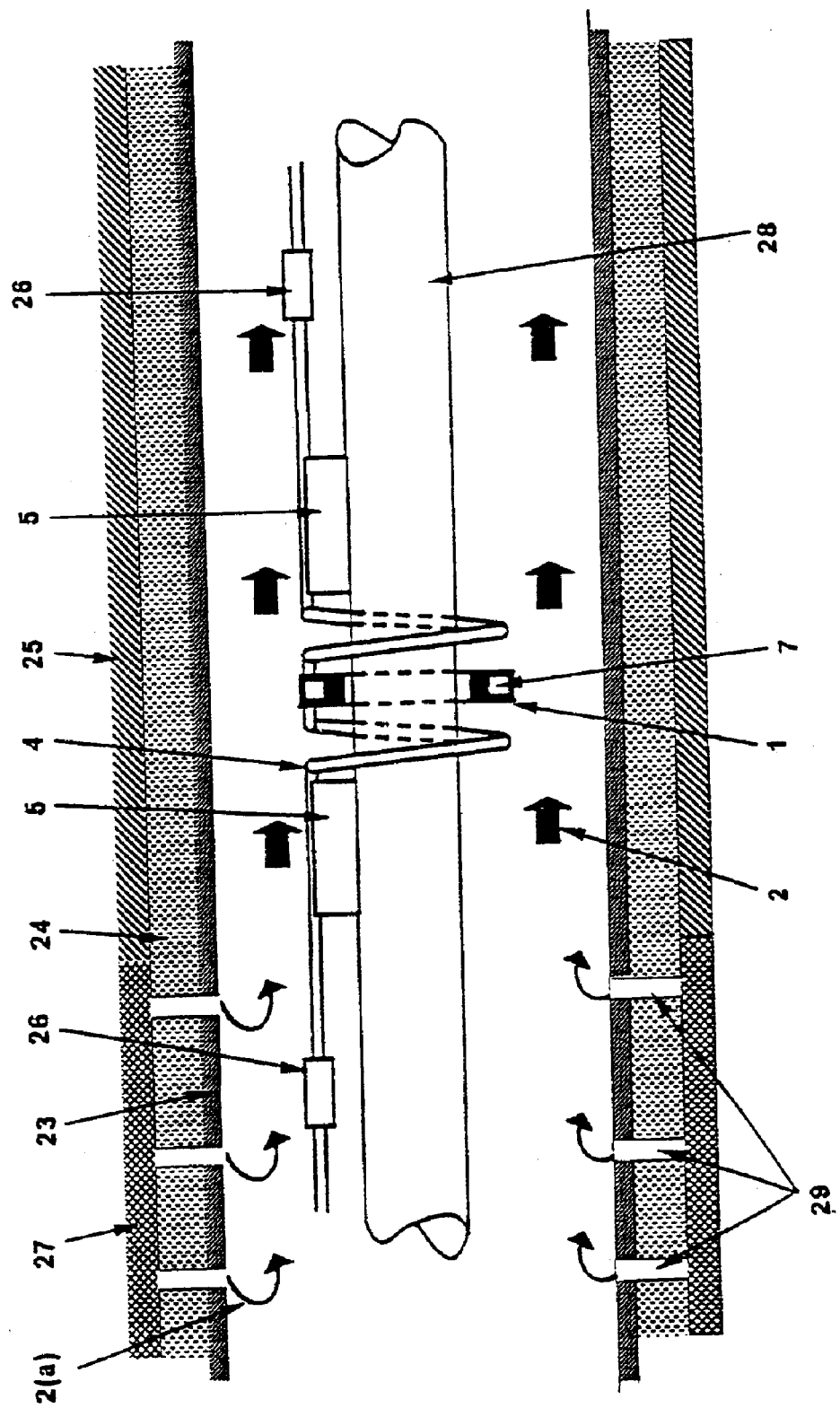
FIG. 5 shows another embodiment of the present invention for use on a stinger into perforated casing liners at the production zone.

FIG. 5 shows another embodiment of the invention for measuring fluid flow 2 at the production zone and is similar to the stinger mounted FIG. 4 embodiment described for the open well excepting that the production zone is cased 23 with perforated or slotted liner 29 which may or may not be cemented 24 into the rock 25. As in the open well embodiment, the sensor measures fluid flow 2 which is the accumulation of all flows 2(a) upstream of the sensor from production of fluids through permeable rock 27 and perforations 29. FIG. 5 uses the same reference numerals as were used to designate same/like parts in the description of FIGS. 1 to 4.

Figure 6:
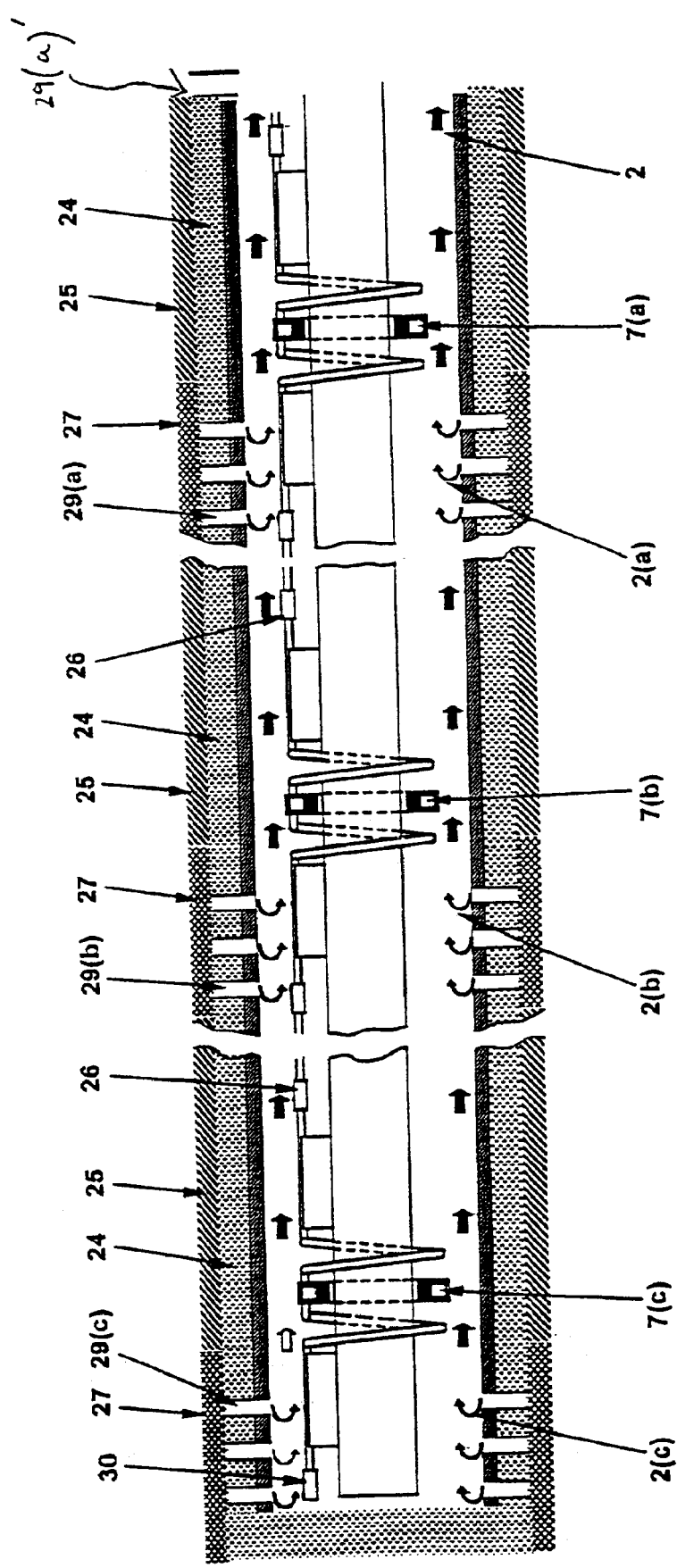
FIG. 6 shows another embodiment of the present invention for use on a stinger at a plurality of positions in the production zone of an oil or gas well where the sensors are measuring the accumulation of fluid as it is produced at a plurality of perforated regions.

FIG. 6 shows another embodiment of the present invention for measuring fluid flow at the production zone and is similar to the stinger mounted FIGS. 4 and 5 embodiments except that a plurality of sensors is installed. In this particular embodiment, three sensors 7(a), 7(b), 7(c) are shown to be mounted at three separate positions of the production zone in between perforations 29(a)', 29(a), 29(b), 29(c). In this situation, sensor 7(c) measures the accumulation of all flow 2(c) from Total Depth (TD), sensor 7(b) measures the accumulation of all flow 2(c) and 2(b) from Total Depth (TD), and sensor 7(a) measures the accumulation of all flow 2(c), 2(b) and 2(a) from Total Depth (TD).

Clearly, this embodiment can be modified to include any number of sensors within the production zone, and thus facilitate the monitoring of fluid production along the entire production zone. While the sensors are conveniently mounted in a series-arrangement, it is possible that the sensors are alternatively mounted in a parallel arrangement within the production zone.

Advantageously, by virtue of combining the differential flow i.e. by combining the quantities of fluid being produced at the various perforated sections of the well, together with disturbed temperature along the production zone, comprehensive well monitoring and planning may be realised in this embodiment.

Further, as shown in the figure, the sensors can be conveniently connected in series on a single fibre by use of optical fibre splice boxes 26 to accommodate any spacing requirement of the sensors between perforations. Splice box 30 is used to provide connectivity to other fibre optic sensors if required. FIG. 6 uses the same reference numbers as were used to designate same/like parts in the description of FIGS. 1 to 5.

Figure 7:
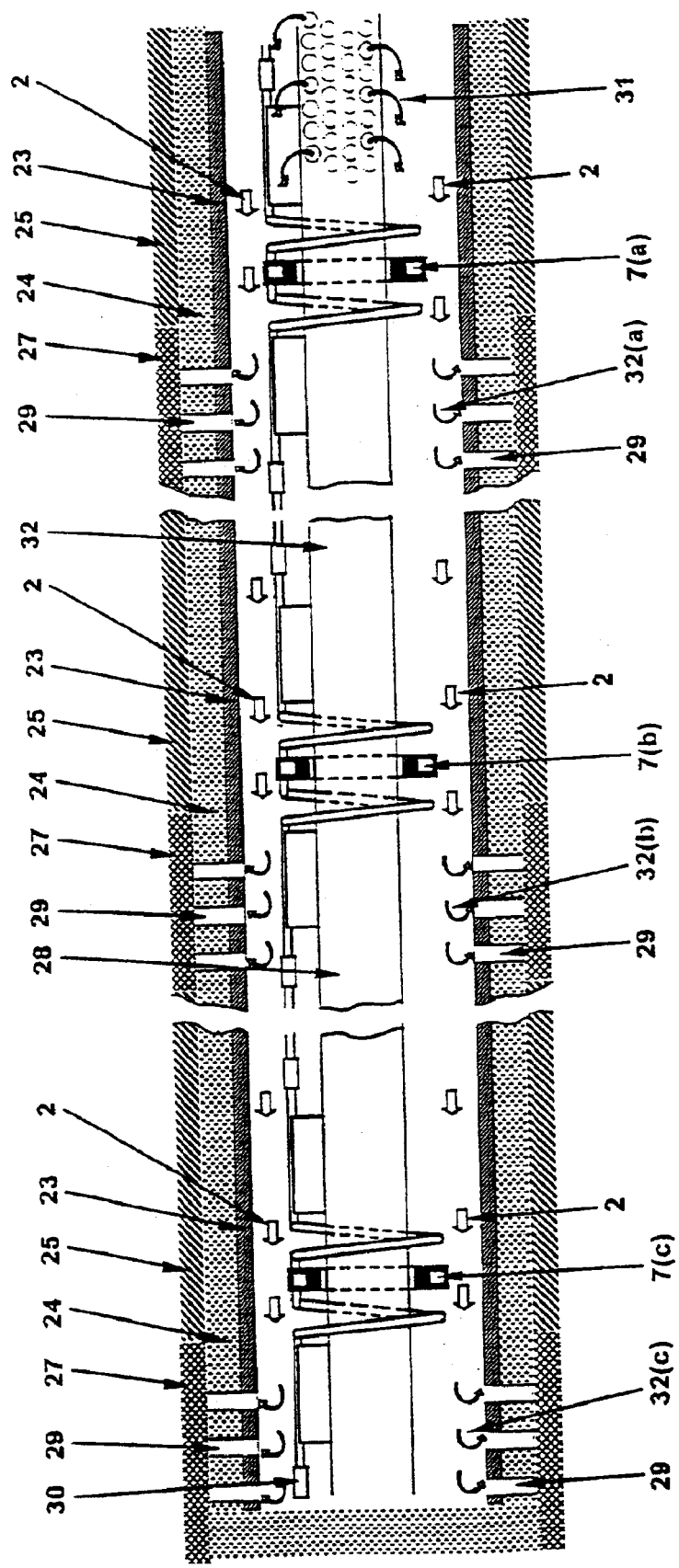
FIG. 7 shows another embodiment of the present invention for use on a stinger at a plurality of positions in a high pressure water injection well where the sensors measure the relative flow of brine into different strata for lifting the oil in nearby production wells.

FIG. 7 shows yet another embodiment of the invention for measuring fluid flow 2 using stinger mounted sensors similar to the plurality of sensors embodiment for measurement of differential flow in the production zone as previously described in relation to FIG. 6. In this embodiment, the fluid flow is reversed and the plurality of sensors is set up for monitoring the differential flow of high pressure fluid (for example water) injected into the permeable rock strata 27 via perforations 29. As shown in the figure, and using three sensors 7(a), 7(b), 7(c), high pressure water is injected into well 31 which then flows in the permeable rock strata through perforated casing 29 at positions 32(a), 32(b), 32(c). In this particular embodiment, the three sensors are used to measure water flow into the strata as follows. Sensor 7(c) monitors the flow into level 32(c), sensor 7(b) monitors flow into 32(c) and 32(b) and sensor 7(a) monitors flow into 32(c), 32(b) and 32(a). Clearly this embodiment can be modified to include any number of sensors. Thus the flow of water into each of the permeable zones is monitored and may be used advantageously for well control and planning purposes. Again, a connection with other fibre optic downhole gauges may be made at splice box 30. FIG. 7 uses the same reference numerals as were used to designate same/like parts in the description of FIG. 6.

Figure 8:
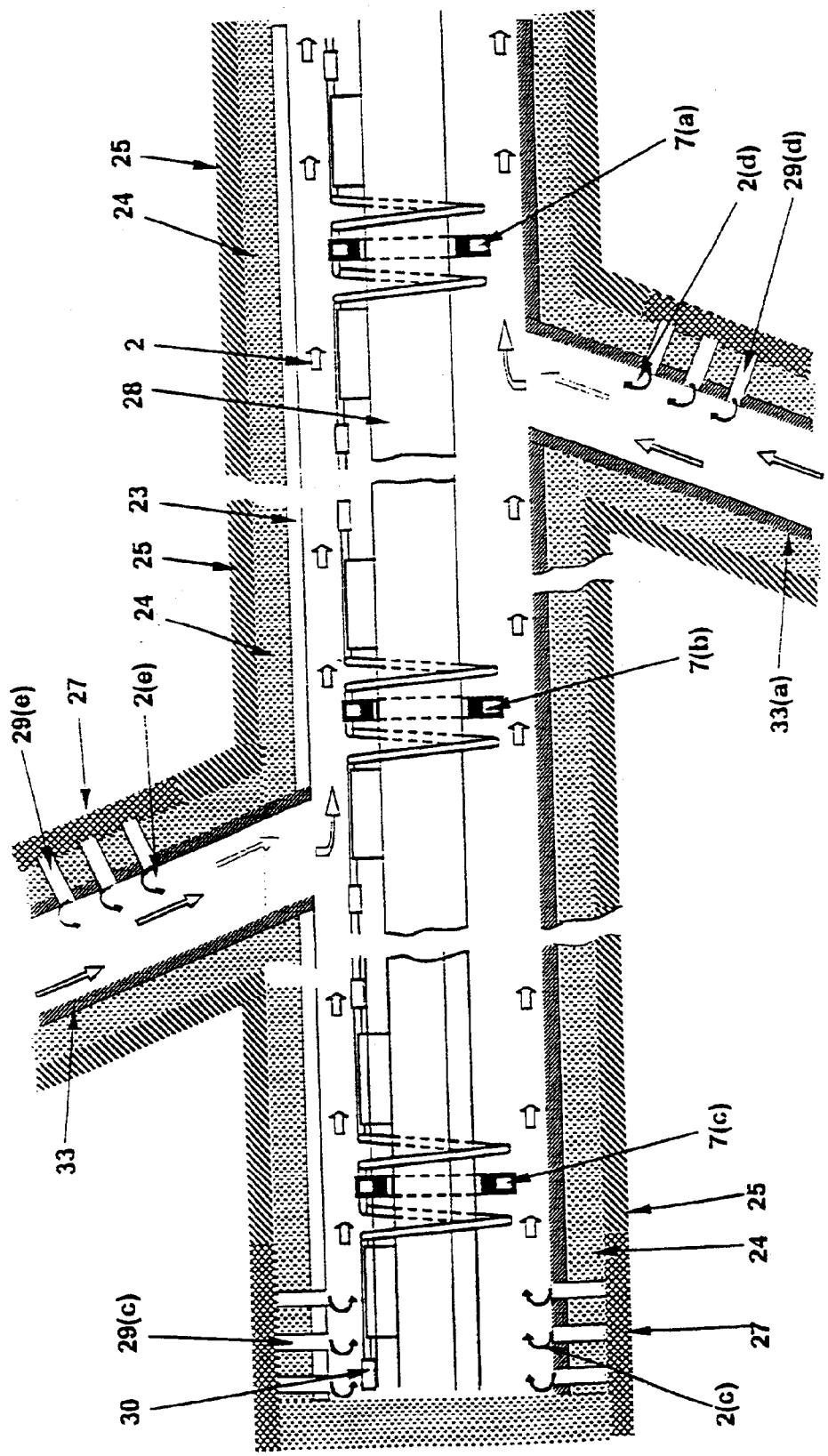
FIG. 8 shows another embodiment of the present invention for use on a stinger at a plurality of positions as in FIG. 6 but where multi-lateral completions are deployed and it is desired to measure the relative oil production from each of them.

FIG. 8 shows another embodiment of the invention applied to monitoring the fluid flow from different perforated production zones 29 which arise in multi-lateral configurations of the downhole completions. The plurality of sensors monitor differential flow in a similar manner to that previously described for a single well (see FIG. 6). As shown in the figure, and using three sensors 7(a), 7(b), 7(c), the sensors are used to monitor fluid production as follows. Sensor 7(c) measures the accumulation of flow 2(c) from Total Depth (TD). Sensor 7(b) measures the accumulation of flow 2(c) from TD and 2(e) produced from the lateral casing 33 at perforations 29(c) and 29(e) and sensor 7(a) measures the accumulation of all flow 2(c), 2(d) and 2(e) produced from lateral casing 33 and 33(e). Again clearly, this embodiment may be modified to include any number of sensors within the production zone containing any number of lateral sections, and again the measurements of differential flow may be combined with other fibre optic gauges either spliced 30 onto the same fibre or deployed on separate control tubes containing fibre optic Distributed Temperature Sensors. FIG. 8 uses the same reference numerals as were used to designate same/like parts in the description of FIGS. 6 and 7.

In operation of the thus described fluid flow sensing arrangement, it will be understood that the sensor provides an output in dependence upon the degree of the sensed perturbations, this being dependent upon the amount of turbulent fluid flow impinging on the sensor. Circuitry associated with the sensor can be used to (1) resolve the sensor output into a signal representative of the sensed perturbations and (2) process the signal to provide measurement of the fluid flow at a predetermined location. It is equally possible to use computer software for controlling the operation of the fluid flow sensor such as to permit the signal response of the sensor to be derived and/or processed.

Theory and Experimental Data for the Flow Sensing Device Based on Broad Band Excitation of a Resonant Structure The description which follows provides some theoretical justification for the above description of the invention, and also contains actual data obtained from an embodiment of the invention installed in an experimental rig.

The intention is to identify some parameter such that the measurand changes monotonically (but not necessarily linearly) with flow speed, the range of interest being from 0.05 m/sec to 1.5 m/sec. Provided the size of the pipe and the viscosity and speed of the fluid are such that the Reynolds Number is always greater than about 2000, then the velocity field in the pipe will be varying in both time and space according to the magnitude of the Reynolds number and the intensity of the associated turbulence. The important feature of this flow is that it is time varying and its broad spectrum defines the turbulent energy across a range of frequencies.

Now suppose a highly resonant mechanical structure is placed in the flow. Provided sufficient energy in the spectrum coincides with the resonant frequency of the structure, the frequency response curve will show a clearly defined peak at that resonant frequency. The amplitude of the peak above the background excitation depends on the extent to which the structure is damped, being inversely proportional to the damping factor, and proportional to the so-called Q factor. The advantage of using a structure with a reasonably high Q factor, say about 10, is that the amplitude at the resonant frequency is magnified by that amount, and is therefore easy to detect above any other noise which may be present in the system. It is observed that this peak amplitude generally increases with increasing flow rate, and it is this property of the system which makes it useful as a flow sensor.

The measurand may be either displacement, velocity, or acceleration. This may be measured with any sensing mechanism which responds in a useful way to the measurand, such as a bundle or coil of optical fibre, as embodied in the present invention.

By way of example, the following theory considers the response of a system which is sensitive to acceleration only, although the theory may be extended to incorporate displacement and velocity measurands without departing from the spirit and scope of the invention.

To predict the performance of this kind of system we have to understand the nature of the excitation forces which may arise from the turbulence of the fluid. The assumption has been made that interfering vibrations due to unwanted mechanisms such as mechanical vibration and vortex shedding have been eliminated.

As described previously, a suitable resonant structure is shown in FIG. 1, and takes the form of a housing 7 mounted on springs 4 containing an accelerometer or some element, such as a coil of optical fibre, sensitive to acceleration. When immersed in a fluid, the effective mass of the sensor increases as its motion accelerates the fluid around it; for a cylinder this so-called added mass is equal to the mass of the fluid displaced by the cylinder, but will be different for other geometries. The effect of immersion is to slightly lower the resonant frequency.

As fluid flows past the structure, it experiences a drag force proportional to the square of the mean fluid velocity. This mean velocity, U, say, consists of two components in addition to the quasi steady flow: the velocity field within the fluid is randomly varying in both time and space, and the structure itself is moving in response to this random input. Since these components are very small compared with the quasi steady component, terms which depend on them quadratically can be ignored, but it turns out that the linearised drag (or damping) coefficient is proportional to U. The Q-factor therefore decreases with increasing flow rate, and the relative amplitude of the peak falls in proportion. At the same time, of course, the turbulent energy is increasing rapidly with flow rate, and the net result is an increase in the rms acceleration.

The distribution of turbulent energy in the frequency domain depends on the friction due to the pipe, which is generally taken to be constant if the pipe is very rough and the Reynolds number greater than about 2000. For smooth pipes, the friction is a weak function of Reynolds number, and hence velocity. It is assumed that the geometry of the installation will remain constant, although it is possible that temperature, and hence viscosity and Reynolds number, may vary. Since it is always possible to measure temperature, the appropriate corrections to the friction factor can be made.

Figure 9:
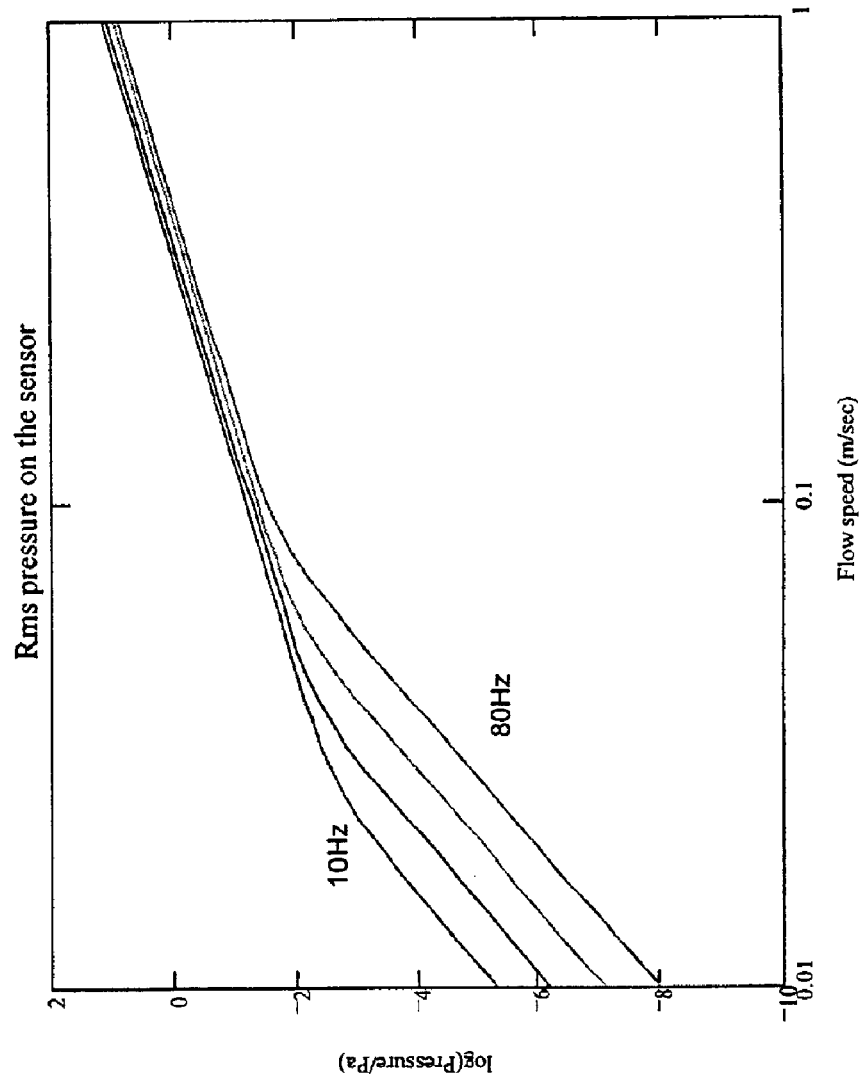
FIG. 9 shows a variation of root mean square (rms) pressure on the sensor of the invention for four frequencies from 10 Hz to 80 Hz.

When plotted on logarithmic axes, the variation of the root mean square (rms) pressure on the body (and hence the body's acceleration) generally consists of straight lines with a characteristic "knee" as shown in FIG. 9. These curves are calculated for four frequencies from 10 Hz to 80 Hz, where the x-axis represents the speed of the fluid flow, and the y-axis is expressed in log(pressure/Pa). It can be seen that the energy available for exciting the structure falls slowly with decreasing flow rate until a critical speed is reached. At this point the energy falls rapidly, and the effectiveness of the device as a flow speed sensor declines. The so-called "viscous corner frequency", which is a function of friction, viscosity and speed, defines the location of the "knee", and it is convenient to ensure that the resonant frequency of the structure is below this corner frequency, which may typically be around 100 Hz for flow rates of the order of 0.1 m/sec.

Figure 10:
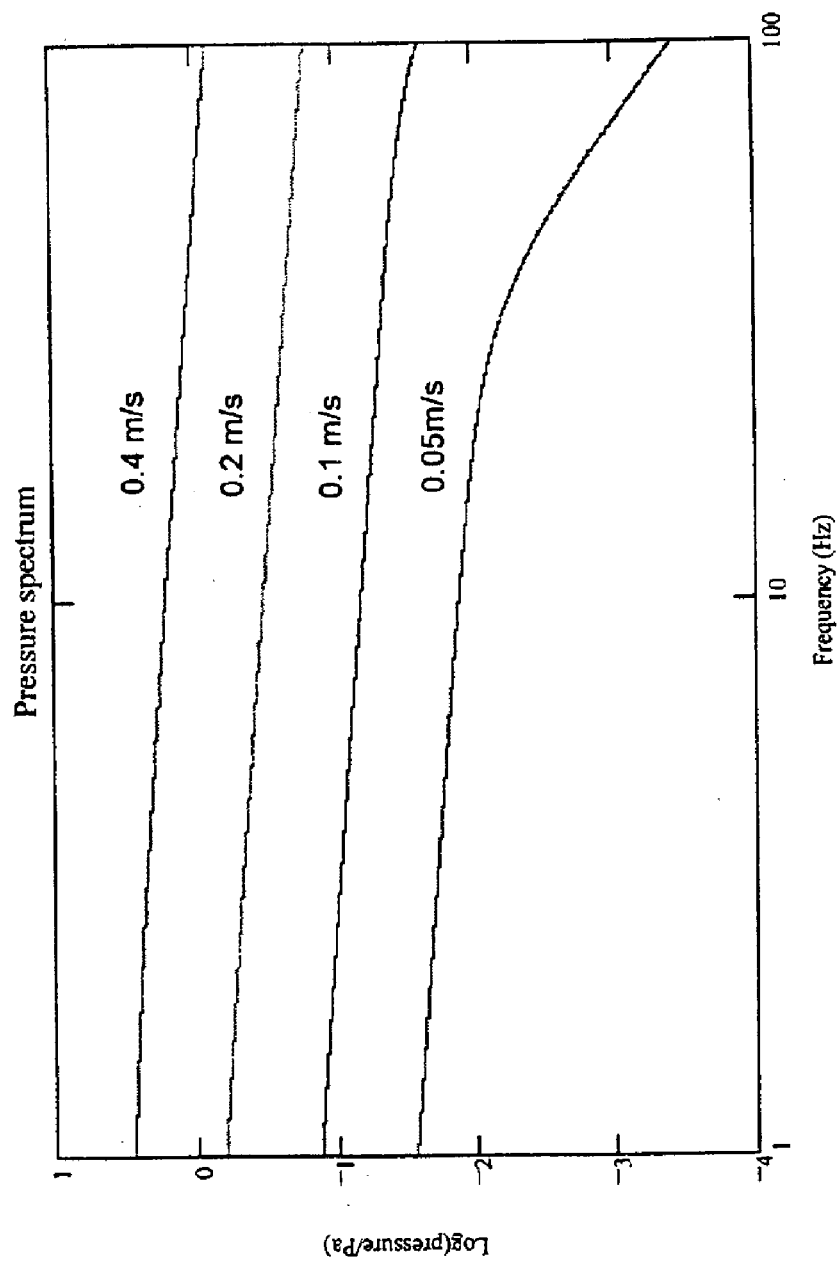
FIG. 10 shows a representative spectrum of pressure on the sensor of the invention over a limited frequency range (1 Hz to 100 Hz) for fluid flow speeds from 0.05 ms$^{-1}$ to 0.4 ms$^{-1}$.
Figure 11:
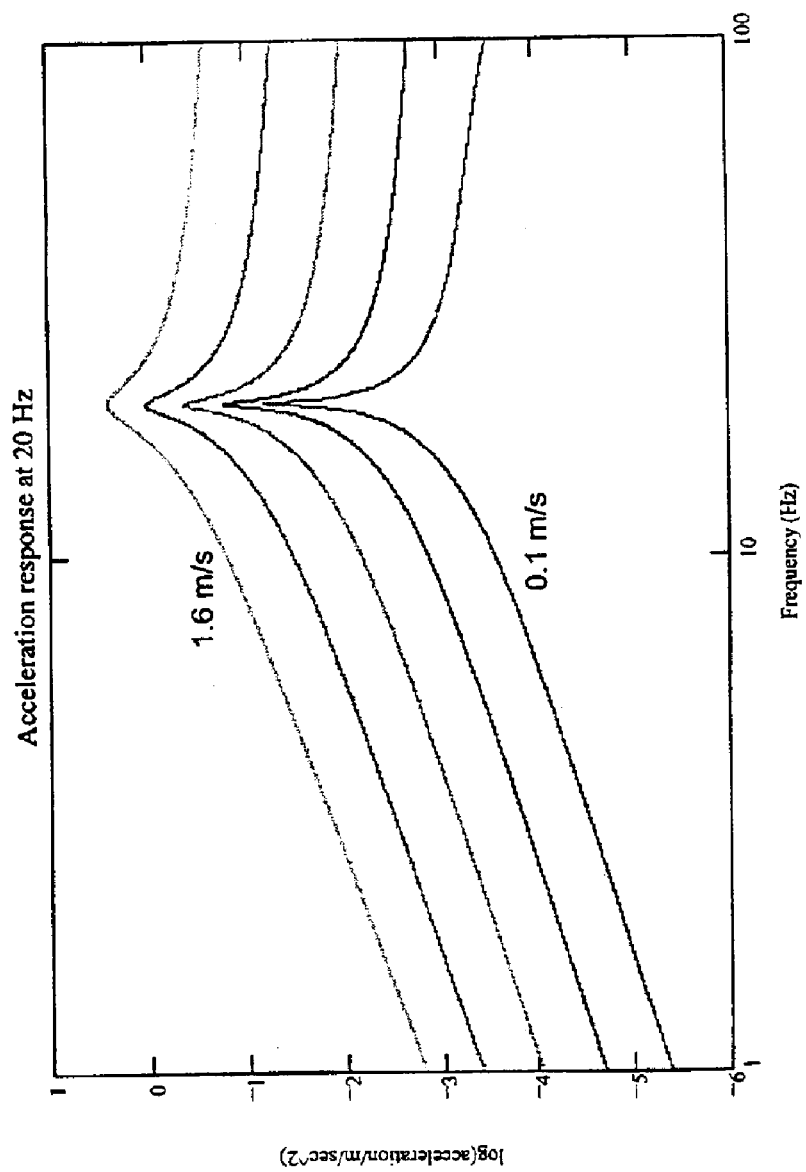
FIG. 11 shows an acceleration response of the sensor of the invention upon excitation by the forces represented by the spectrum of FIG. 10.
Figure 12:
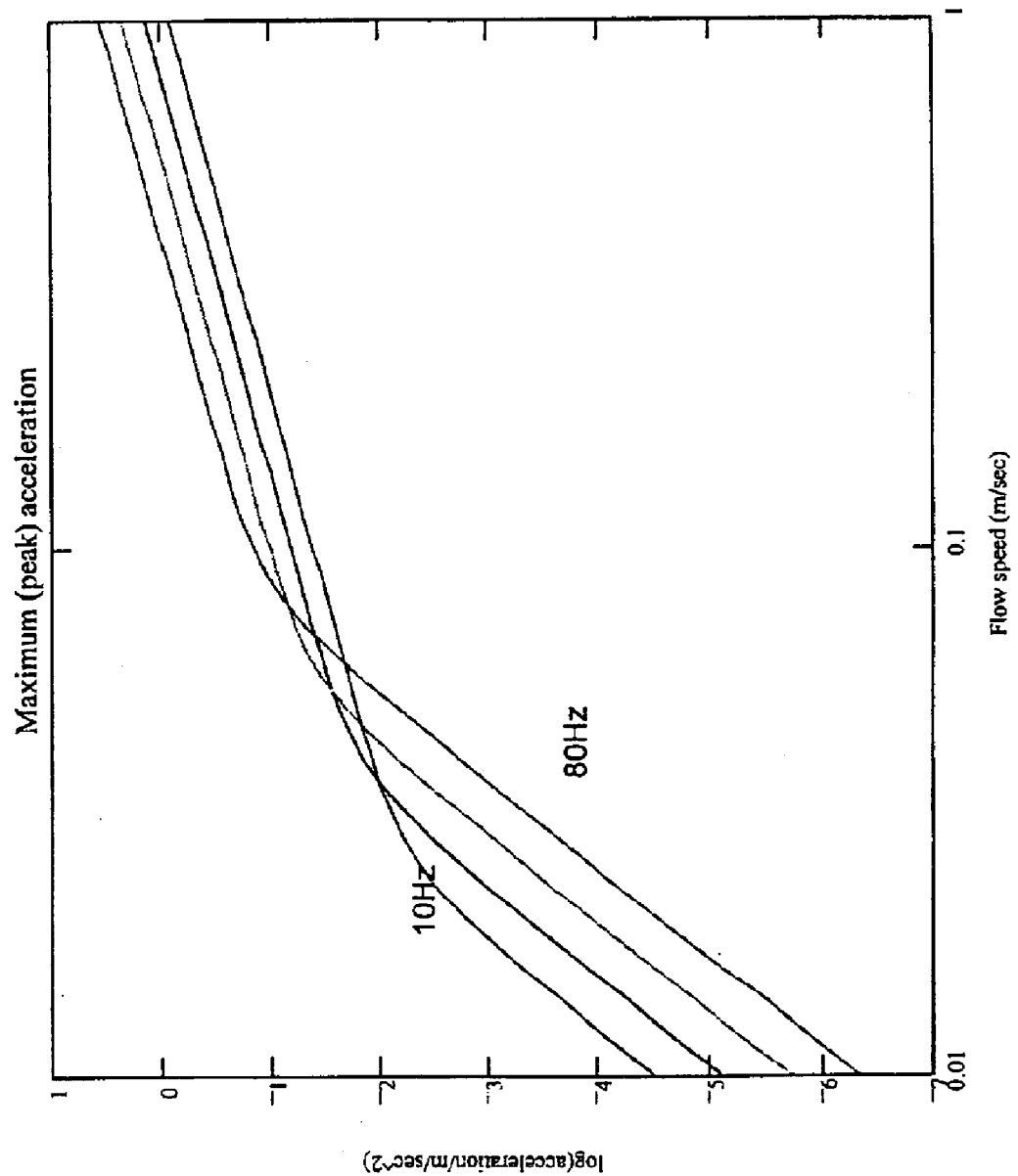
FIG. 12 shows the predicted maximum (peak) acceleration response of the sensor of FIG. 11 for a range of resonant frequencies from 10 Hz to 80 Hz.
Figure 13:
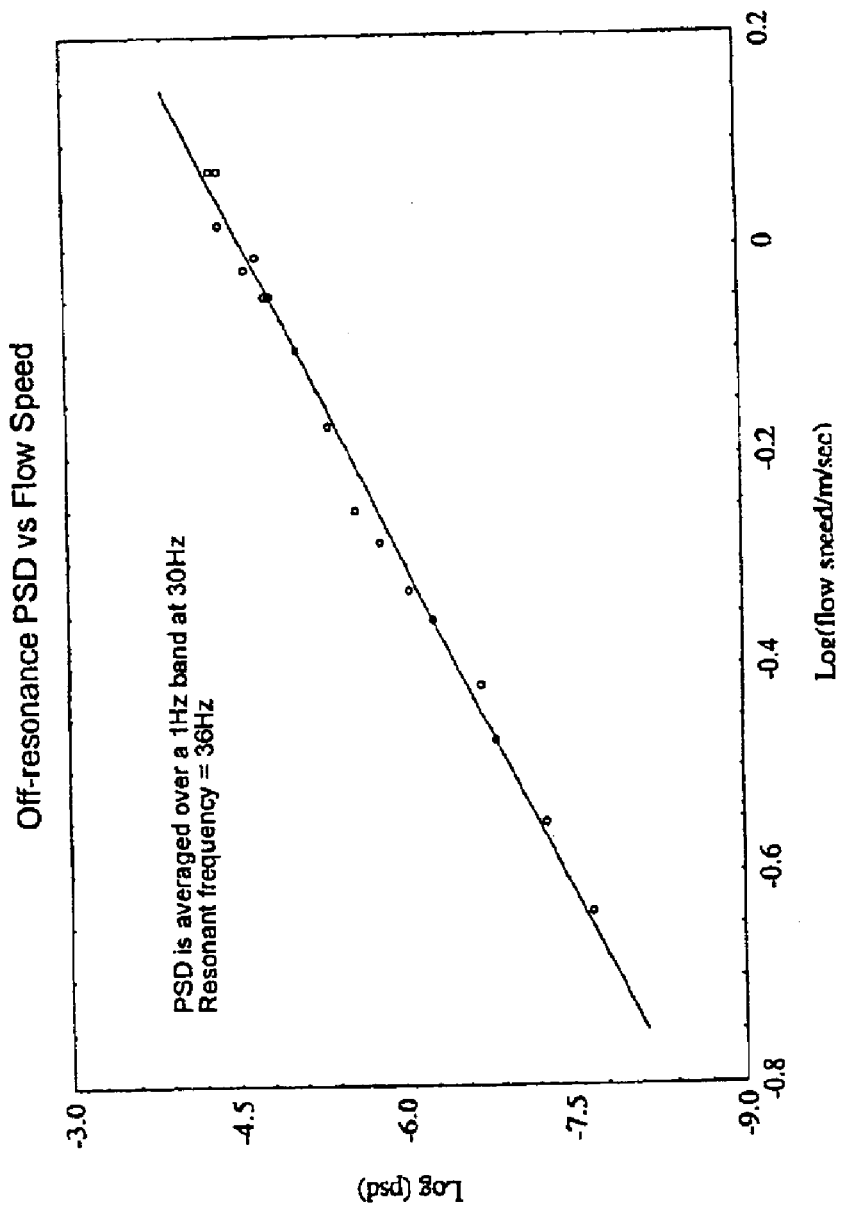
FIG. 13 shows a measured off-resonance power spectral density (psd) response of the sensor of the invention.
Figure 14:
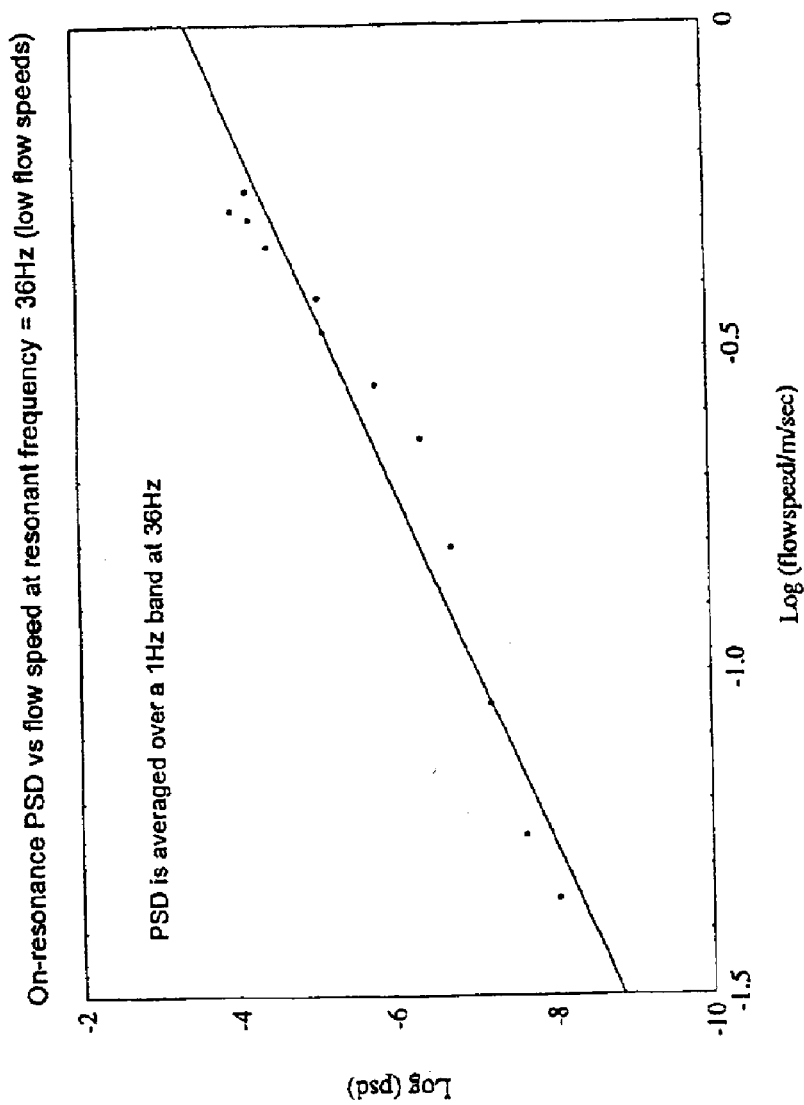
FIG. 14 shows a measured on-resonance power spectral density (psd) response of the sensor of the invention.

FIG. 10 shows a representative spectrum of mean square pressure over a limited frequency range for flow speeds from 0.05 m/sec to 0.4 m/sec. When applied to a mass, of course, its rms acceleration is proportional to the rms pressure. The resonant structure is taken to be a linear, 2nd order mechanical system whose response after excitation by the forces represented by the spectrum in FIG. 10, has the appearance shown in FIG. 11. A range of flow speeds from 0.1 m/sec to 1.6 m/sec is represented, and the resonant frequency is 20 Hz. If just the maximum amplitude of the response is measured, the predicted result is as shown in FIG. 12 for a range of resonant frequencies from 10 Hz to 80 Hz. From this it can be seen that below the knee the output falls rapidly, and so for good sensitivity at low flow rates, it is necessary to choose quite a low resonant frequency, say around 20 Hz. It is not always necessary to measure at the resonant frequency itself, and FIG. 13 shows experimental data for which measurements were taken off resonance at 30 Hz. (The resonant frequency of the system was 36 Hz). Here the power spectral density (psd) has been averaged over a 1 Hz band and plotted against log (flow speed) to give a usefully linear curve, showing that the relationship between the turbulence induced vibration and flow speed is approximately a power law. FIG. 14 shows a set of similar results taken on-resonance at 36 Hz for low flow speeds from 0.05 m/sec to 0.6 m/sec.

A source of mechanical interference is the vibration of the entire support structure holding the sensor thereby causing the sensor to vibrate additionally to the impingement of fluid flow. Under these circumstances there may be other resonances superimposed on the response of the resonator.

Further, in down-hole production well applications, there is the possible requirement for the sensor to operate in an environment where mechanical vibration is transmitted through the production tubing or extension thereof (the so-called stinger). This mechanical vibration emanates either from the production rig floor or from down-hole mechanical installations such as electric submersible pumps or down-hole apparatus of any description, and may cause mechanical interference such that the entire support structure holding the sensors may vibrate, thereby interfering with the accuracy of the flow measurement causing the sensor to vibrate additionally to the impingement of fluid flow. This will interfere with the accuracy or sensitivity of both broadband and narrowband measurement techniques. One known solution by way of example is to rigidly mount reference sensors or accelerometers in close proximity to the flow sensors, such that the motion of the structure is measured and adaptive processing methods may be deployed to reduce the level of broadband or normal interference. This is a method that might be described as common practice by those skilled in the art of noise and vibration cancellation.

Another known solution for the avoidance of the interfering tonal vibrations which emanates from down-hole motors and pumps at frequencies related to rotational speed, is to choose the resonant frequency of the sensor such that it avoids these tonal frequencies facilitating an accurate measurement of flow by the on resonance method.

Figure 15:
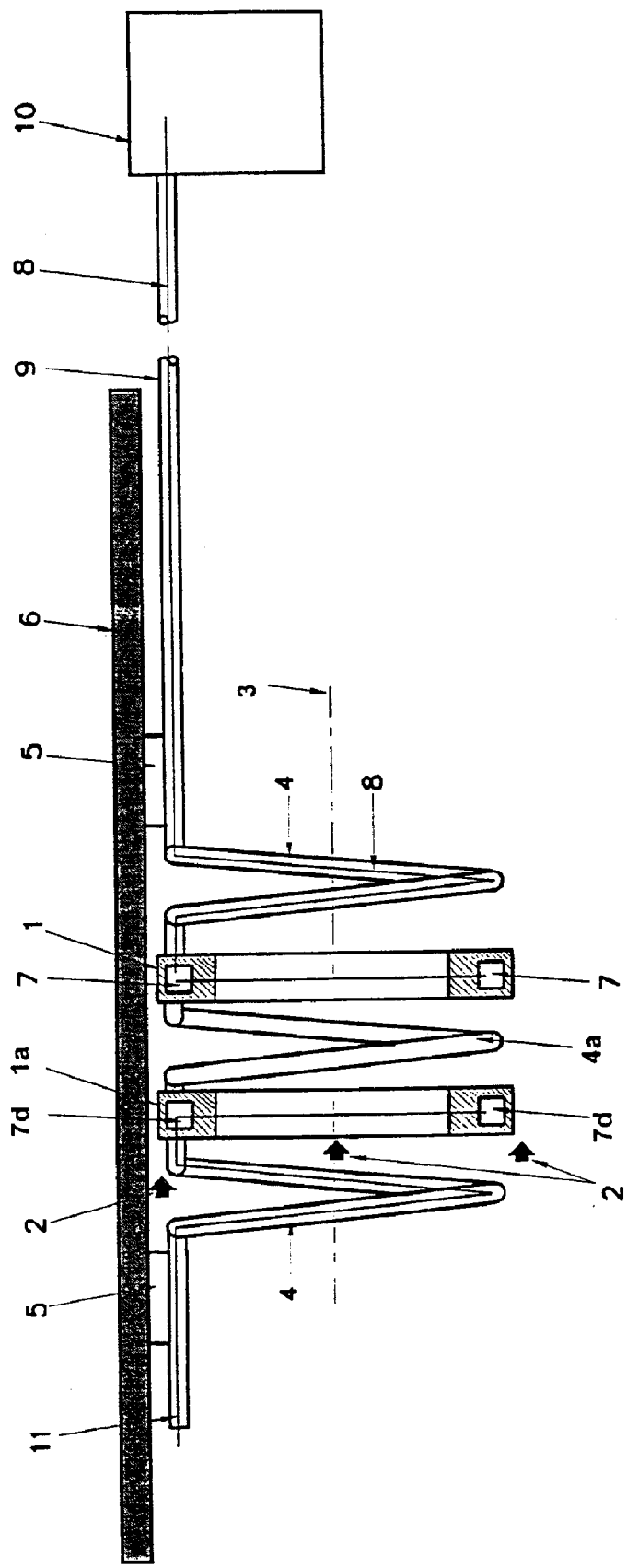
FIG. 15 shows another embodiment of the present invention for use in downhole production well applications.

Referring to FIG. 15, there is shown yet another fluid sensing apparatus 1, 1a embodying the present invention and it is noted that this Figure differs from that already described in FIG. 1 by the addition of dual sensor body members 1a. For the sake of clarity, the same reference numerals have been used in FIGS. 1 and 15 to denote same/like parts. As shown, the dual sensor devices are attached to springs 4 and 4a which allow the devices 1, 1a to be perturbed in a direction of axis shown as 3. The springs 4 and 4a are conveniently axial coil-springs which in combination with the masses of devices 1 and 1a enable the devices 1, 1a to resonate in the direction of axis 3 caused by the broadband energy in the frequency spectrum of the forces in the turbulent fluid flow impinging on the devices 1, 1a. Due to circumstances of the embodiment of the sensors in downhole, or other environments, vibrations transmitted through the pipework or concrete anchorage point 6 are also transferred to the sensor devices 1, 1a by interfering mount 5. This interfering vibration also enables the device 1, 1a to resonate in the axis direction 3. The details of the realisation of distributed sensor 7, 7d and means of multiplexing and processing are all as hereinabove described with reference to FIGS. 1 to 8 inclusive.

There now follows a description of the action of the dual sensor devices of FIG. 15, which together respond as a mechanical filter to suppress the possible interfering vibrations, transmitted through mount 5.

The purpose of the double sensor devices 1, 1a is to generate two principal resonances in the axis direction 3. The lower frequency resonance represents the two devices moving axially in phase together by the combination of the springs 4, 4a in resonance with the mass of sensor devices 1, 1a. Such resonances may be excited by both turbulent flow and the axial vibration of the stinger. The higher principal axial resonance is the result of the two sensor devices 1, 1a moving in opposite directions out of phase with each other by, again, the combination of the springs 4, 4a in resonance with the mass of sensor device 1 and sensor device 1a. Such a higher resonance can be generated by turbulent flow, as before, and if the mounts 5 are separated by a distance small compared with the wavelengths of the interfering vibration, it is not excited by the axial vibration of the mounts. The method of measuring turbulent flow is thus to measure the magnitude of the higher frequency out of phase resonance which is unaffected by axial vibration of the mounts 5. In the same way that the resonant vibration of the sensors is due to the extraction of energy from the broadband energy in the turbulent flow, at both higher and lower resonant frequencies, the resonant excitation of the sensors at the lower frequency is due to noise vibration of the energy from the broadband energy in the frequency spectrum of the interfering forces impinging on the mounts 5 only. In this manner, the double sensor behaves as a mechanical filter whereby the measurement of the magnitude of the higher resonant frequency will only be due to the turbulent flow excitation and vibration interference is separated in frequency.

Simple Theory Related to the Double Sensor Primary Resonance Frequencies.

Figure 16:
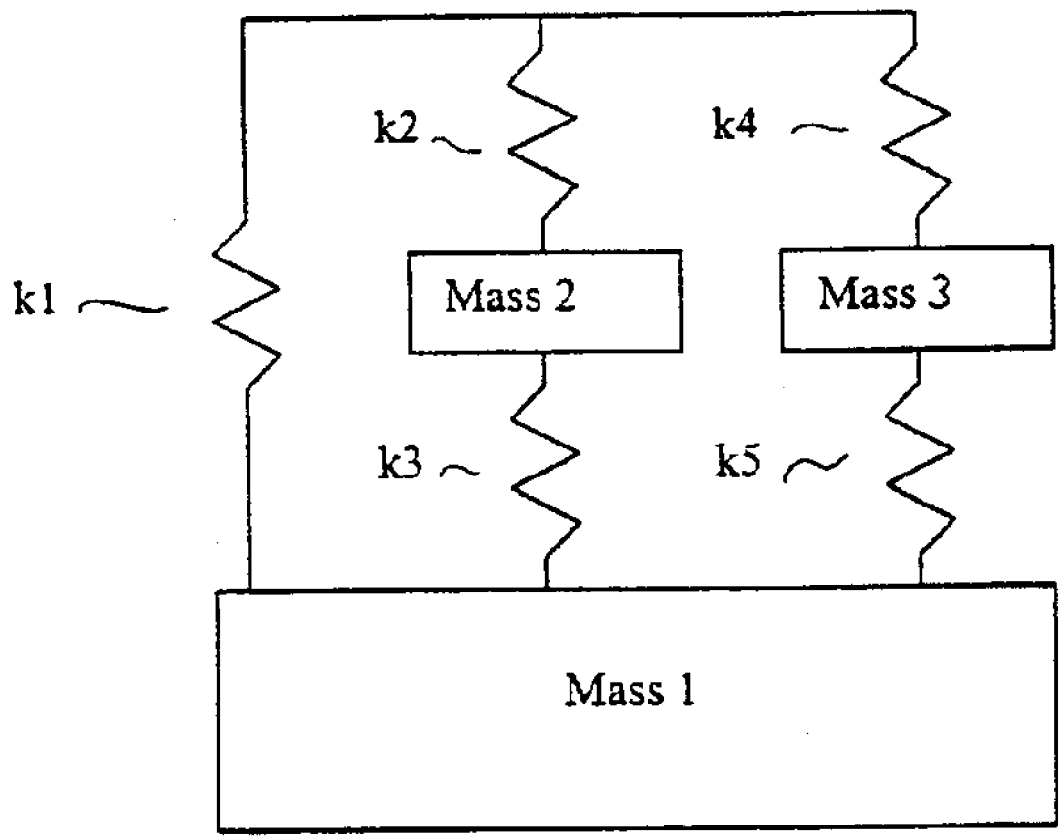
FIG. 16 shows a mechanical model representative of the response of the sensor arrangement of FIG. 15.

A simple 4 degrees of freedom mechanical model is described in FIG. 16 to represent the axial response of the dual sensor embodiment of FIG. 15. The FIG. 15 embodiment is based on the principle of mounting the identical two sensors at a common point, thereby reducing the effect of transmission of vibration at the mount. In FIG. 16, the mass 1 represents the mass of the supporting structure in FIG. 15. The structure 6 is considered to be high mass and all spring mounts 5 are considered to be at one common node point, that is high vibration coherence between the two mounts.

Referring to FIG. 16, the masses 2 and 3 represent sensors 7d of FIG. 15. The stiffness K2 and K4 represent the spring coiled tubes linking the sensors 7d in FIG. 15 with an attached spring stiffness K1 at the centre tap joining this point to the common node point. In practice, this stiffness is preferentially considered to be zero in the calculations, inferring no connection to the mid-point of K2, K4 which may thus be realised as one spring; shown as 4a in FIG. 15. The stiffness K3 and K4 are the coil springs 4 in FIG. 15. Running a computer model with the following parameters has been done as a worked example:

Mass 1=1000 kg (infinite)

Mass 2=Mass 3=0.43 kg $K2=K4=23340N^{M-1}$ $K3=K5=1167NM^{M-1}$

And of course $K1=0NM^{M-1}$

Figure 17:
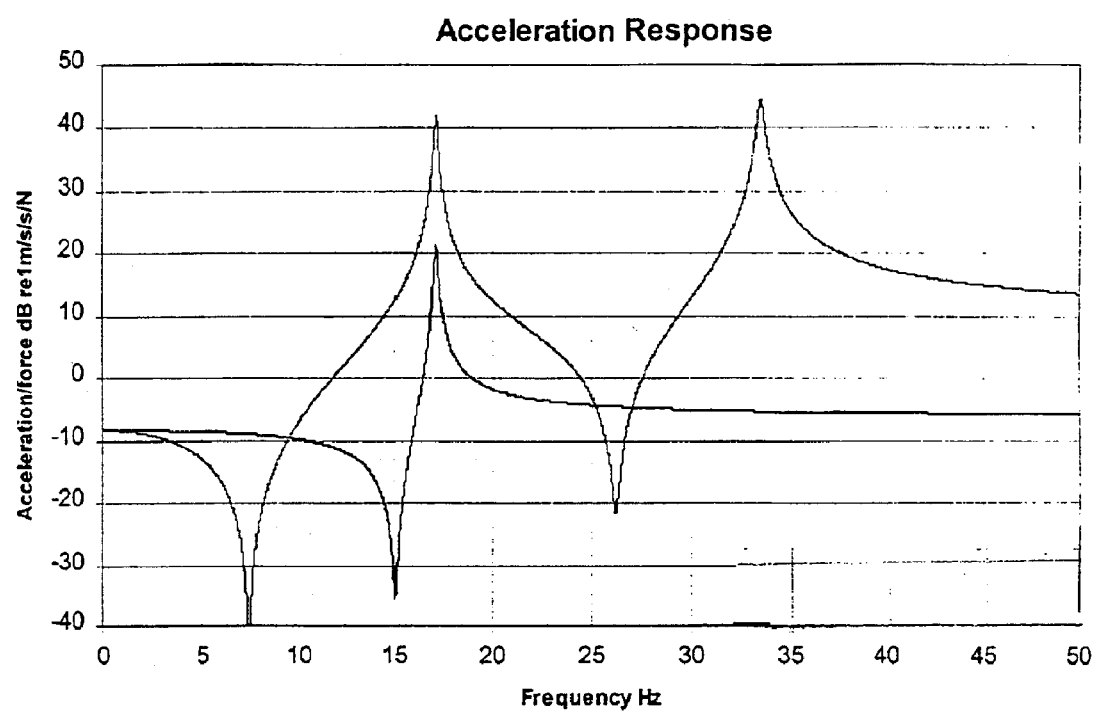
FIG. 17 shows an acceleration response of the sensor arrangement of FIG. 15.

The acceleration response of this system with respect to frequency is shown in FIG. 17.

The lower curve in FIG. 17 shows the acceleration at the common node point on Mass 1 (i.e. mounts 5 in FIG. 15) and is due to be induced excitation of the structure 6 by remote interfering sources.

The upper curve in FIG. 17 shows the acceleration of Mass 2 and Mass 3 due to flow excitation and also from interfering vibration excited through the mounts. It can be seen from the plots that the out-of-phase resonance occurs at the higher resonant frequency (approx. 34 Hz in this example) and that the excitation of the structure 6 (Mass 1) does not excite the out-of-phase resonance but does excite the in phase resonance (at approx. 17 Hz in this example). It is thus to be appreciated that the measurement of excitation at the higher resonant frequency represents an interference free measurement of fluid flow.

Having thus described the present invention by reference to several preferred embodiments, it is to be appreciated that the embodiments are in all respects exemplary and that modifications and variations are possible without departure from the spirit and scope of the invention. For example, the scope of the sensing arrangement could possibly be improved, if desired, by provision of additional sensors in the production zone where the fluid flow rate is to be measured. Further, the sensing arrangement could be easily modified to combine the intelligent use of distributed flow rate measurements with intelligent down-hole completions so that control valves may be activated to shut down laterals or production zones thus maximising the production of the wanted fluid, for example by shutting off water. Furthermore, whilst the body member of the sensor is preferably a cylindrical member with an aperture, the body member could alternatively be of a different shape and size without an aperture and the same or similar technical effect of the invention would be obtained. Also, the actual sensor technology for use in the present invention could be various and could even be inclusive of electronic technology where high temperature/harsh environments are not such an issue to the fluid flow rate measurements.

What is claimed is:

1. A fluid flow sensing apparatus for measuring a fluid flow rate, the apparatus comprising:
   fluid flow sensing means for sensing perturbations associated with the apparatus, said perturbations being produced by broadband energy in the turbulent fluid flow impinging on said apparatus;
   means for deriving a signal response representative of the sensed perturbations;
   processing means for processing the derived signal response to provide measurement of the fluid flow rate at a predetermined location; and
   an axial coil spring to which the sensing means is coupled, enabling the sensing means to be mounted in the fluid flow and to be vibrated over a range of frequencies about a resonant frequency, in dependence upon the impingement of the turbulent fluid flow on the apparatus.

2. An apparatus as claimed in claim 1, wherein the fluid flow sensing means comprises a sensor device having a body member with an aperture, the sensor device being adapted and arranged to permit the passage of the fluid flow through the aperture and/or around the outside surface of the body member.

3. An apparatus as claimed in claim 2, wherein a predetermined axis is defined in relation to the body member of the sensor device such that, in use, the sensor device is perturbed along said predetermined axial direction.

4. An apparatus as claimed in claim 2, wherein the signal response is adapted to be processed to provide measurements of displacement and/or time derivatives of displacement of said sensor device.

5. An apparatus as claimed in claim 4, wherein said measurements are further processed and calibrated to provide a direct interpretation of the fluid flow rate such that, in use, the apparatus operates as a fluid flow meter.

6. An apparatus as claimed in claim 4, wherein said measurements are representative of the broadband energy in the turbulent flow of the fluid, such flow producing an at-resonance excitation of the sensor device.

7. An apparatus as claimed in claim 6, wherein the signal response is adapted to be calibrated to record the at-resonance excitation condition as a function of fluid flow rate.

8. An apparatus as claimed in claim 4, wherein said measurements are representative of the broadband energy in the turbulent flow of the fluid, such flow producing an off-resonance excitation of the sensor device.

9. An apparatus as claimed in claim 8, wherein the signal response is adapted to be calibrated to record the off-resonance excitation condition as a function of fluid flow rate.

10. An apparatus as claimed in claim 1, wherein the spring comprises a hollow spring which is adapted and arranged to accommodate signal carrying means so as to permit the transmission of the signal response from the sensor device to the processing means.

11. An apparatus as claimed in claim 1, wherein the spring is adapted and arranged to provide a resonance condition of said apparatus.

12. A fibre optic sensing system comprising a fluid flow sensing apparatus as claimed in claim 1.

13. A system as claimed in claim 12, wherein the fluid flow sensing means comprises one or more fibre optic sensors including fibre optic sensing coil means which is arranged to form part of an optical time domain reflectometric interferometer.

14. A system as claimed in claim 13, further comprising time multiplex means to time multiplex a plurality of said fibre optic sensors onto one optical fibre such that, in use of the system, fluid flow gradients can be measured along an array of said sensors.

15. A system as claimed in claim 14, further comprising optical frequency multiplex means to optically frequency multiplex a plurality of said fibre optic sensors onto one optical fibre such that, in use of the system, fluid flow gradients can be measured along an array of said sensors.

16. A system as claimed in claim 15, wherein means are provided for combining time multiplex means and optical frequency multiplex means enabling arrays of said fibre optic sensors to be employed.

17. A system as claimed in claim 16, wherein the arrays of the fibre optic sensors are adapted and arranged to be multiplexed with downhole fibre optic gauges and/or sensors on the same optical fibre.

18. A fibre optic sensing system as claimed in claim 12, further comprising mechanical filter means for removing interfering vibration, which filter means comprises two sensing devices coupled together by spring means, enabling the two sensing devices to be mounted in the fluid flow and to be vibrated over a predetermined range of frequencies.

19. A fibre optic sensing system as claimed in claim 18, wherein the predetermined range of frequencies comprises a first principal axial resonance frequency and a second principal axial resonance frequency, a lower of said first and second resonance frequencies being associated with an in-phase movement of masses of the two sensing devices and a higher of said first and second resonance frequencies being associated with an out-of phase movement of the masses of the two sensing devices.

20. A fibre optic sensing system as claimed in claim 19, wherein the lower of said first and second resonance frequencies is generated by impingement of the turbulent flow on the system and by the excitation attributed to interfering vibration.

21. A fibre optic sensing system as claimed in claim 20, wherein the interfering vibration is a vibration of mounting means onto which the spring means is attached.

22. A fibre optic sensing system as claimed in claim 19, wherein the higher of said first and second resonance frequencies is generated by the impingement of the turbulent flow on the system.

23. A fibre optic sensing system as claimed in any of claims 19 to 22, wherein the signal response is adapted to be processed such that the out-of-phase higher resonant frequency response is calibrated to provide a direct interpretation of the fluid flow rate such that, in use, the system operates as a fluid flow meter insensitive to interfering vibration.

24. A fibre optic sensing system as claimed in claim 23, wherein the fluid flow meter is insensitive to the vibration of the mount onto which the system is attached.

25. A fibre optic sensing system as claimed in claim 18 having a remote sensing capability of remotely sensing oil, water and gas flow rates at a plurality of predetermined locations in pipelines, production tubing, wells, open case wells, injection wells and tunnels.

26. A fibre optic sensing system as claimed in claim 12 having a capability to permit the sensor to be installed in various types of production pipe such that, in use, the sensor does not interfere with the operation of production logging tools.

27. A fluid flow sensing apparatus as claimed in claim 1 further comprising mechanical filter means for removing interfering vibration, which filter means comprises two sensing devices coupled together by spring means, enabling the two sensing devices to be mounted in the fluid flow and to be vibrated over a predetermined range of frequencies.

28. A fluid flow sensing apparatus as claimed in claim 27, wherein the predetermined range of frequencies comprises a first principal axial resonance frequency and a second principal axial resonance frequency, a lower of said first and second resonance frequencies being associated with an in-phase movement of masses of the two sensing devices and a higher of said first and second resonance frequencies being associated with an out-of phase movement of the masses of the two sensing devices.

29. A fluid flow sensing apparatus as claimed in claim 28, wherein the lower of said first and second resonance frequencies is generated by impingement of the turbulent flow on the apparatus and by the excitation attributed to interfering vibration.

30. A fluid flow sensing apparatus as claimed in claim 29, wherein the interfering vibration is a vibration of mounting means onto which the spring means is attached.

31. A fluid flow sensing apparatus as claimed in claim 28, wherein the higher of said first and second resonance frequencies is generated by the impingement of the turbulent flow on the apparatus.

32. A fluid flow sensing apparatus as claimed in any of claims 28 to 31, wherein the signal response is adapted to be processed such that the out-of-phase higher resonant frequency response is calibrated to provide a direct interpretation of the fluid flow rate such that, in use, the apparatus operates as a fluid flow meter insensitive to interfering vibration.

33. A fluid flow sensing apparatus as claimed in claim 32, wherein the fluid flow meter is insensitive to the vibration of the mount onto which the apparatus is attached.

34. A fluid flow sensing apparatus as claimed in claim 1 having a remote sensing capability of remotely sensing oil, water and gas flow rates at a plurality of predetermined locations in pipelines, production tubing, wells, open case wells, injection wells and tunnels.

35. A fluid flow sensing apparatus as claimed in claim 1 having a capability to permit the sensor to be installed in various types of production pipe such that, in use, the sensor does not interfere with the operation of production logging tools.

36. A method of measuring a fluid flow rate, the method comprising:
sensing perturbations associated with a fluid flow sensing apparatus as claimed in claim 1, said perturbations being produced by the broadband energy in the turbulent fluid flow impinging on said apparatus;
deriving a signal response representative of the sensed perturbations; and
processing the derived signal response to provide measurement of the fluid flow rate at a predetermined location.

37. A method as claimed in claim 36, wherein the sensing is carried out optically by means of a fibre optic sensing coil.

38. A method as claimed in claim 36 or claim 37, further comprising mechanically filtering the signal response enabling an interference-vibration free measurement of the fluid flow rate to be provided at said predetermined location.

39. A computer program which when loaded into a computer will enable the computer to operate with a fluid flow sensing apparatus as claimed in claim 1 such as to enable the signal response to be derived and/or processed.

40. A fluid flow sensing apparatus for measuring a fluid flow rate, the apparatus comprising:
a fluid flow sensor configured to sense perturbations associated with the apparatus, said perturbations being produced by broadband energy in the turbulent fluid flow impinging on said apparatus;
a device configured to derive a signal response representative of the sensed perturbations;
a processor configured to process the derived signal response to provide measurement of the fluid flow rate at a predetermined location; and
an axial coil spring to which the sensor is coupled, enabling the sensor to be mounted in the fluid flow and to be vibrated over a range of frequencies about a resonant frequency, in dependence upon the impingement of the turbulent fluid flow on the apparatus.

41. A fibre optic sensing system comprising a fluid flow sensing apparatus comprising:
a fluid flow sensor configured to sense perturbations associated with the apparatus, said perturbations being produced by broadband energy in the turbulent fluid flow impinging on said apparatus;
a device configured to derive a signal response representative of the sensed perturbations;
a processor configured to process the derived signal response to provide measurement of the fluid flow rate at a predetermined location; and
an axial coil spring to which the sensor is coupled, enabling the sensor to be mounted in the fluid flow and to be vibrated over a range of frequencies about a resonant frequency, in dependence upon the impingement of the turbulent fluid flow on the apparatus.

42. A method of measuring a fluid flow rate, the method comprising:
sensing perturbations associated with a fluid flow sensing apparatus comprising:
a fluid flow sensor configured to sense perturbations associated with the apparatus, said perturbations being produced by broadband energy in the turbulent fluid flow impinging on said apparatus;
a device configured to derive a signal response representative of the sensed perturbations;
a processor configured to process the derived signal response to provide measurement of the fluid flow rate at a predetermined location; and
an axial coil spring to which the sensor is coupled, enabling the sensor to be mounted in the fluid flow and to be vibrated over a range of frequencies about a resonant frequency, in dependence upon the impingement of the turbulent fluid flow on the apparatus;
deriving a signal response representative of the sensed perturbations; and
processing the derived signal response to provide measurement of the fluid flow rate at a predetermined location.

43. A computer program which when loaded into a computer will enable the computer to operate with a fluid flow sensing apparatus for enabling a signal response to be derived and/or processed, said apparatus comprising:
a fluid flow sensor configured to sense perturbations associated with the apparatus, said perturbations being produced by broadband energy in the turbulent fluid flow impinging on said apparatus;
a device configured to derive a signal response representative of the sensed perturbations;

a processor configured to process the derived signal response to provide measurement of the fluid flow rate at a predetermined location; and an axial coil spring to which the sensor is coupled, enabling the sensor to be mounted in the fluid flow and to be vibrated over a range of frequencies about a resonant frequency, in dependence upon the impingement of the turbulent fluid flow on the apparatus.

* * * * *